United States Patent

[11] 3,571,833

| [72] | Inventors | James W. Cadwallader<br>1042 Pine Grove Ave., Lansdale, Pa.<br>19446;<br>Francis R. Kull, 800 Blue Bell Road,<br>Warminster, Pa. 18974 |
|---|---|---|
| [21] | Appl. No. | 746,637 |
| [22] | Filed | July 22, 1968 |
| [45] | Patented | Mar. 23, 1971 |

[54] APPARATUS FOR APPLYING NYLON TAB IN A NUT
11 Claims, 10 Drawing Figs.

[52] U.S. Cl................................................. 10/72, 10/169
[51] Int. Cl..................................................... B21d 53/24
[50] Field of Search............................................ 10/2, 10, 10 (P), 11, 72, 86, 86 (A), 169; 151/7

[56] References Cited
UNITED STATES PATENTS

| 1,047,288 | 12/1912 | Radack........................ | 10/169 |
| 2,657,402 | 11/1953 | Poupitch..................... | 10/2 |
| 2,980,928 | 4/1961 | Wallace et al. ............... | 10/2 |
| 3,170,176 | 2/1965 | Brightman et al ........... | 10/72 |
| 3,213,175 | 10/1965 | Wallace....................... | 10/72 |
| 3,294,139 | 12/1966 | Preziosi....................... | 10/10 |
| 3,159,855 | 12/1964 | Wallace et al ............... | 10/10 |
| 3,437,541 | 4/1969 | Cooper et al. ............... | 151/7 |

Primary Examiner—Charles W. Lanham
Assistant Examiner—Michael J. Keenan
Attorneys—Stanley Belsky and Curtis Morris & Safford ABSTRACT: A continuously moving support is provided to receive threaded female fastener elements from a continuous-feed mechanism. The fastener elements are moved by the support through a heating zone to a thermoplastic patch insert station where patches of thermoplastic material are inserted into the hot threaded fasteners. The elevated temperature of the threaded fasteners causes the thermoplastic patches to fuse and bond to the threads of the fastener elements and the fastener elements are then moved to an ejection station where they are collected.

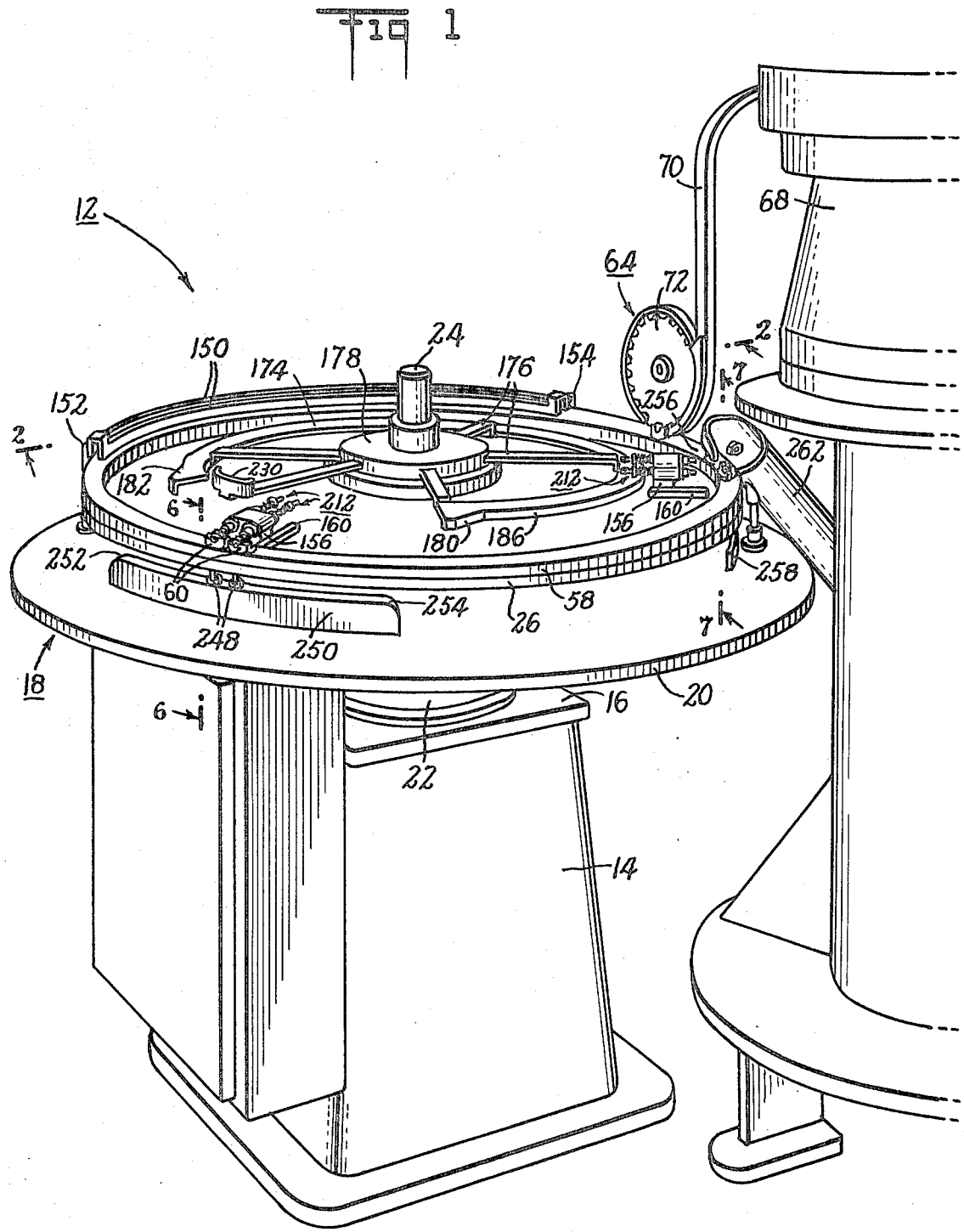

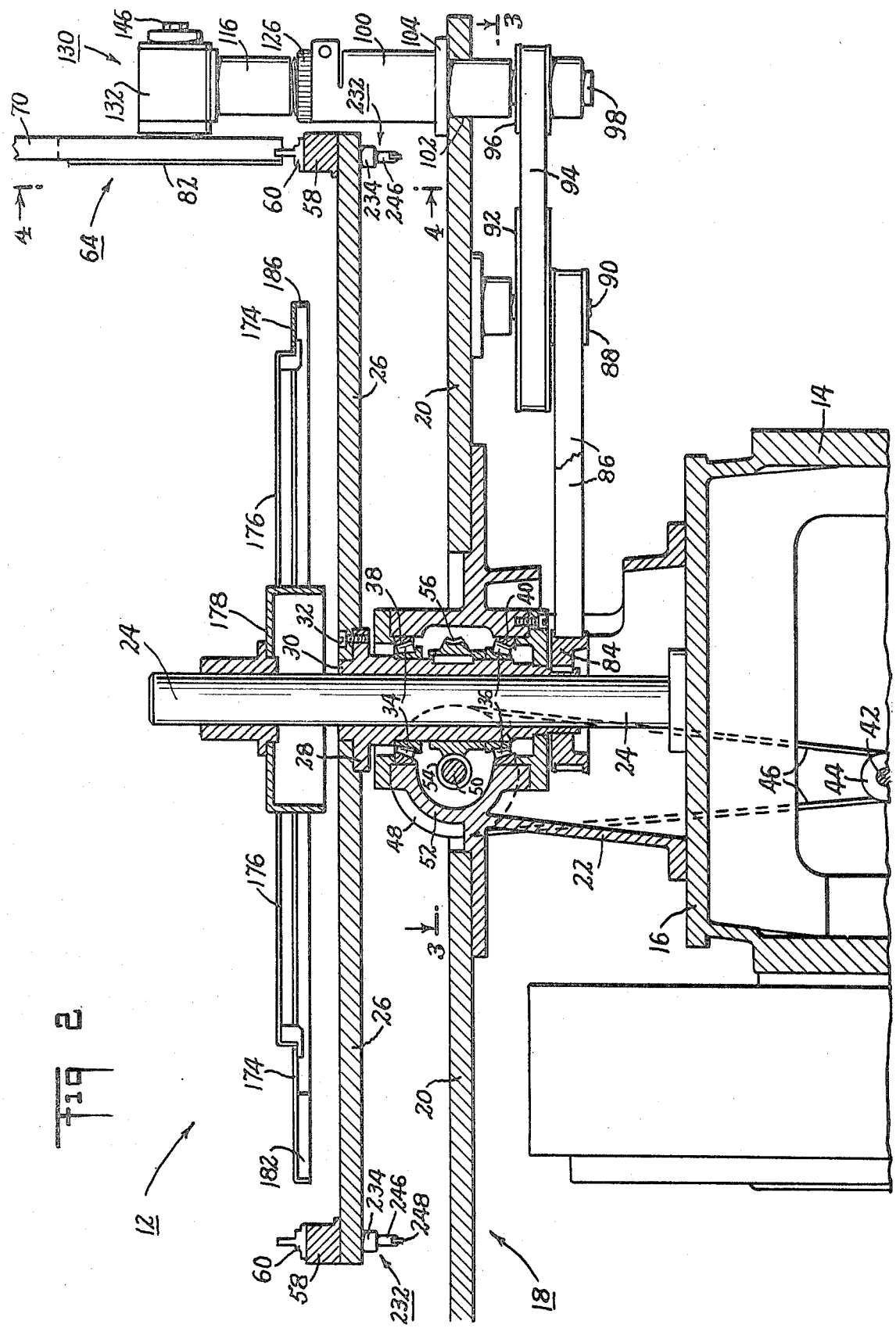

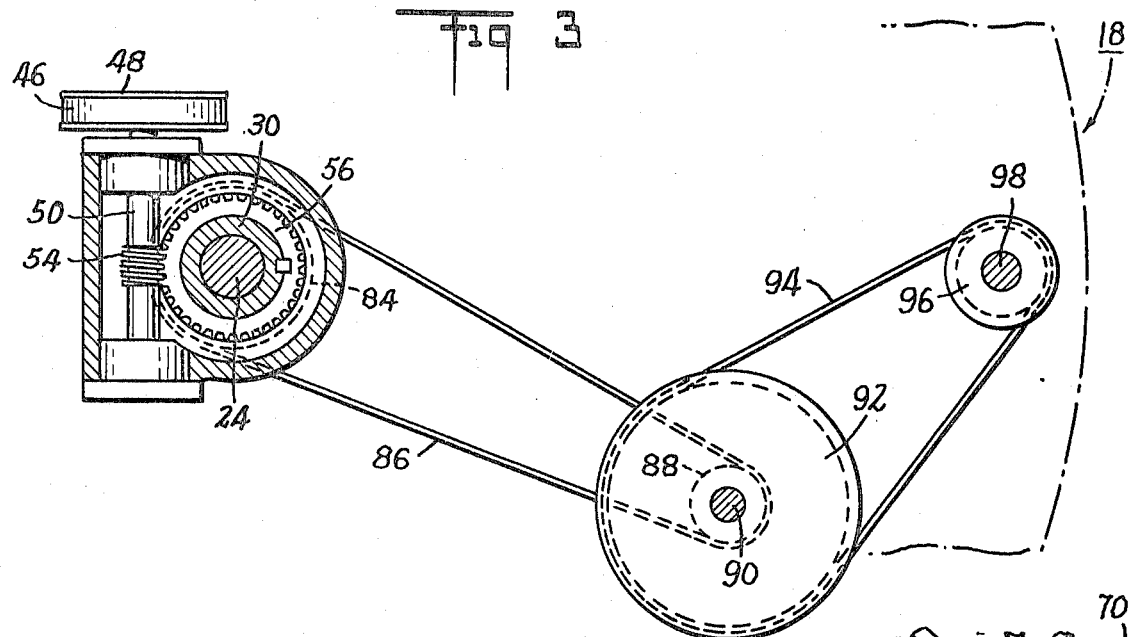
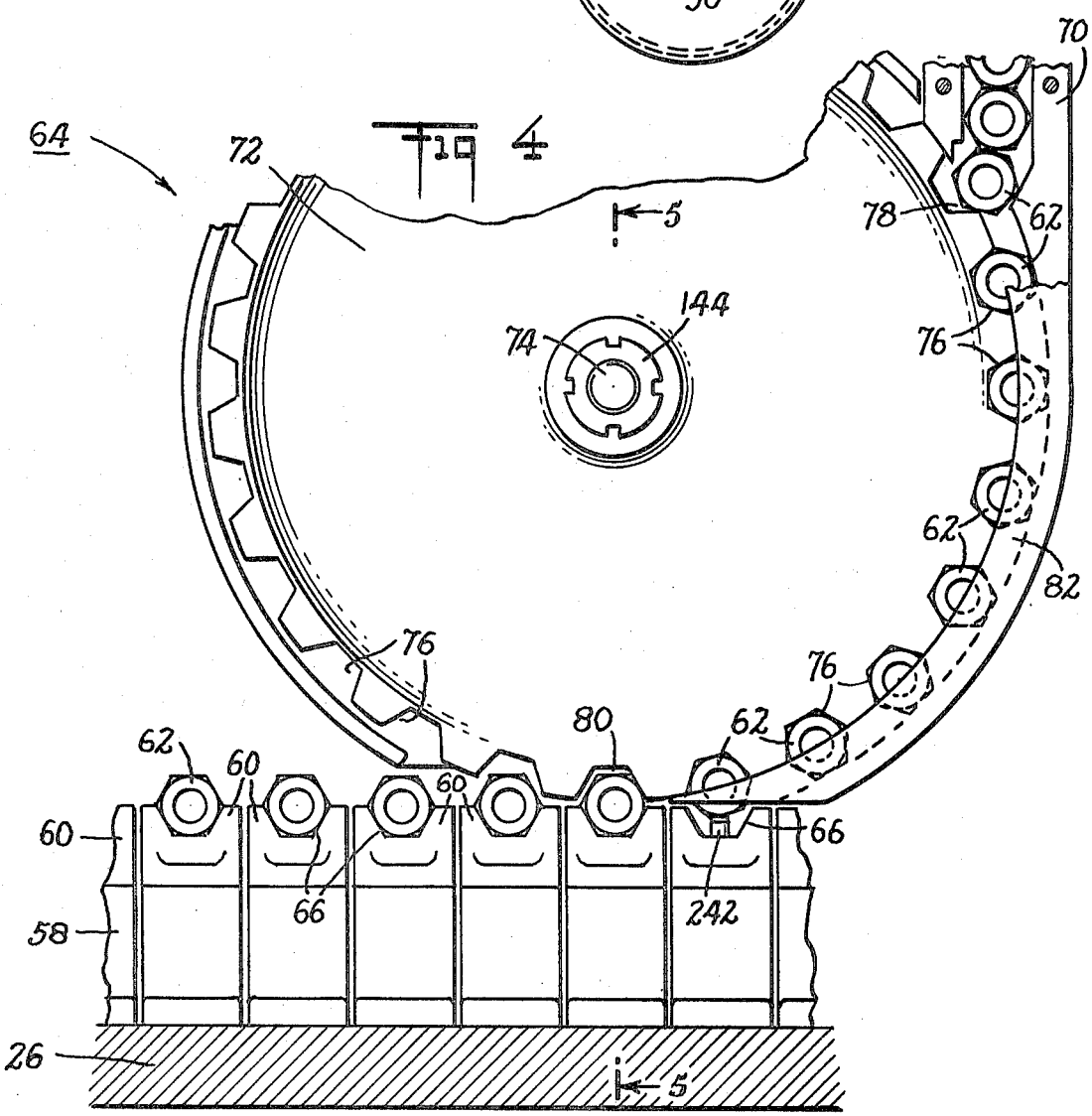

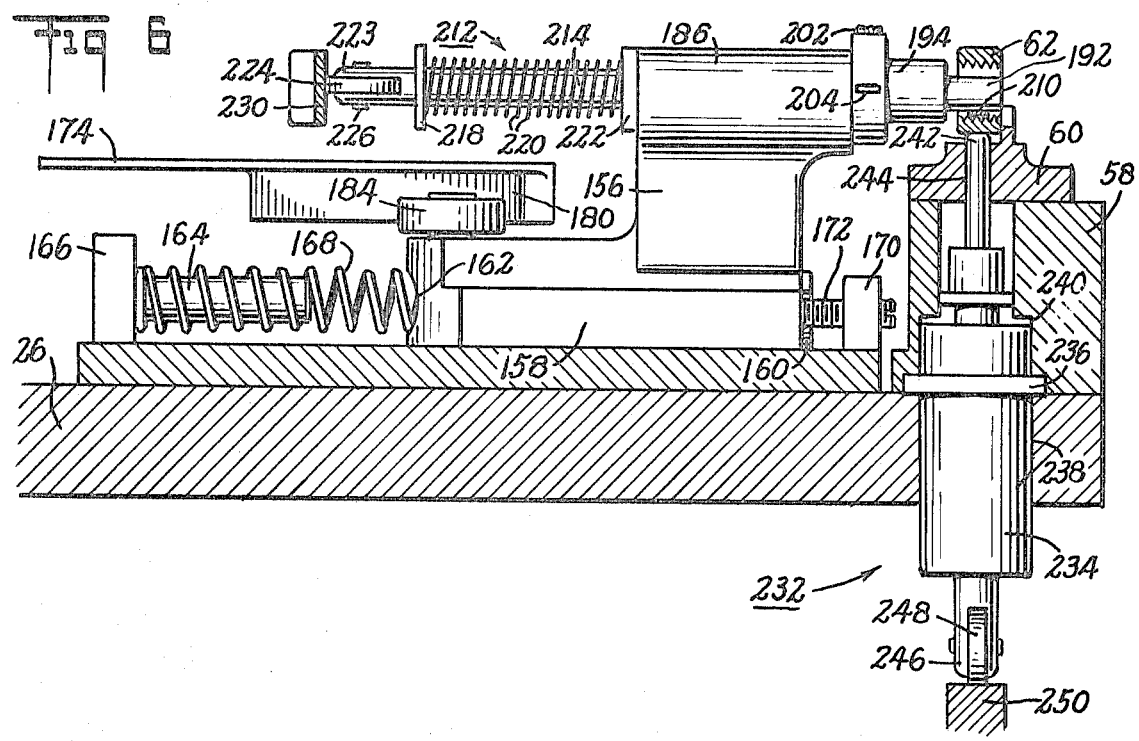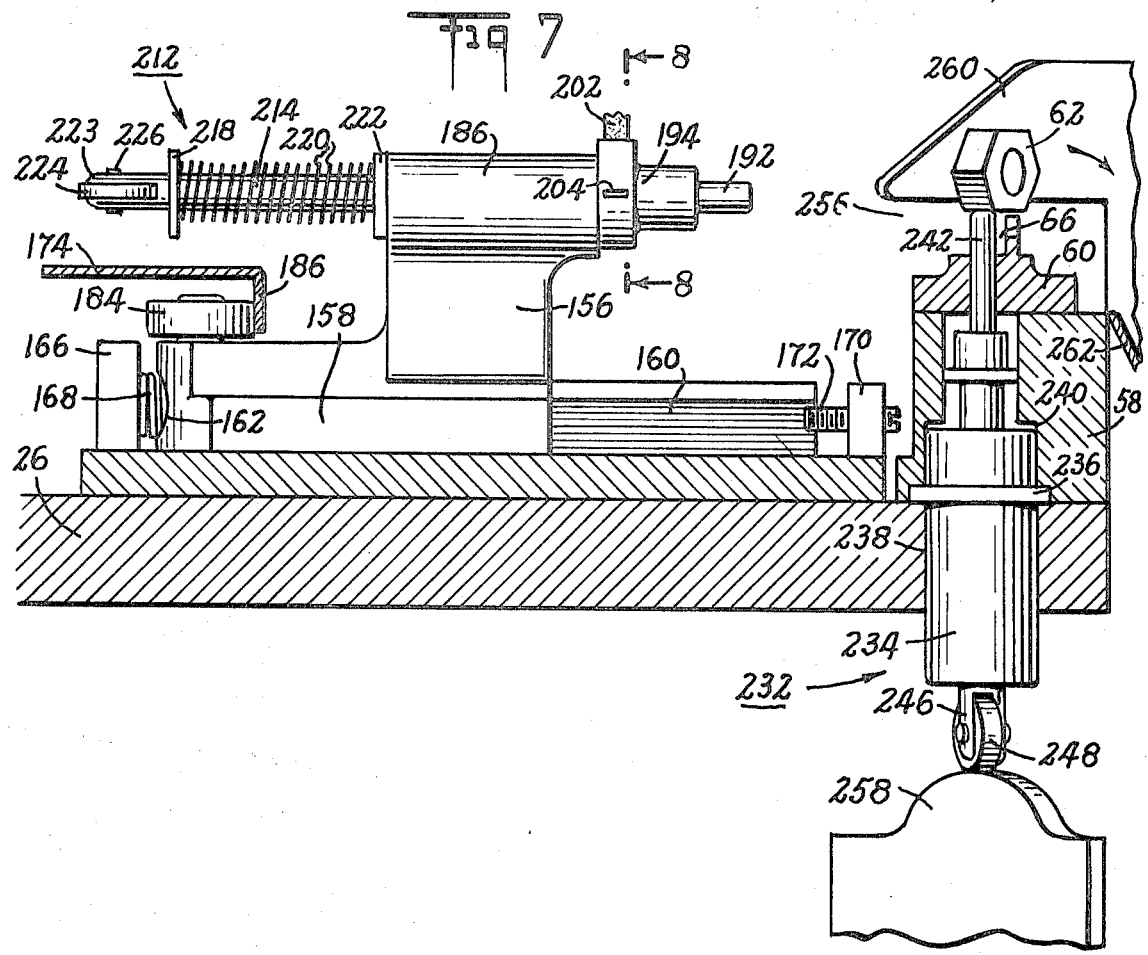

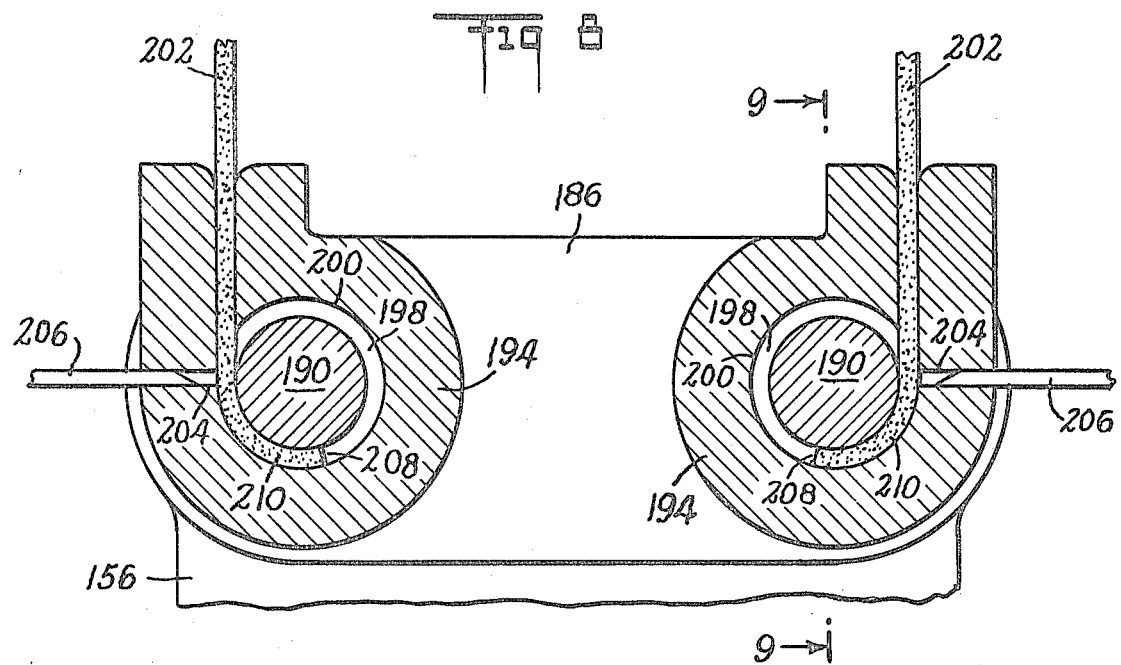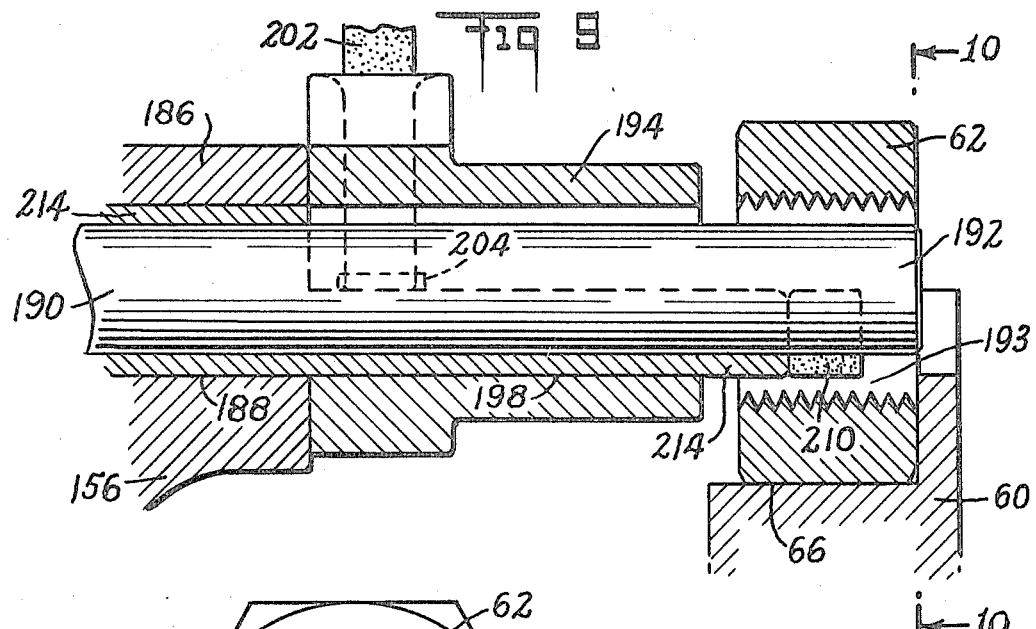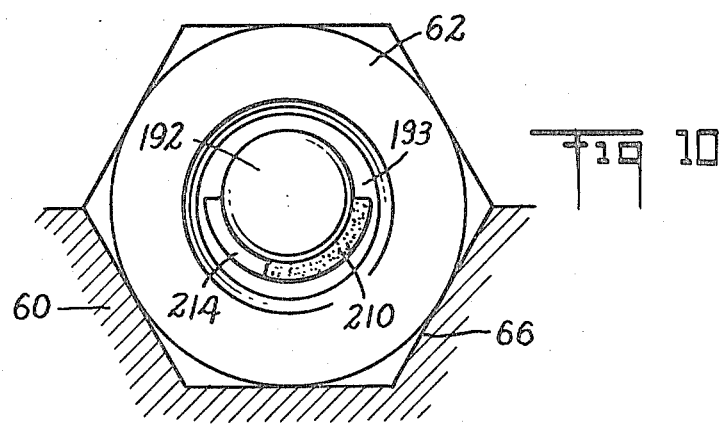

APPARATUS FOR APPLYING NYLON TAB IN A NUT

This invention relates to an apparatus for making self-locking threaded fasteners of the type having a locking patch of thermoplastic resin bonded to the undistorted thread surfaces.

Self-locking threaded fasteners of the type having a locking patch of thermoplastic resin bonded to the internal thread surfaces are disclosed in the application of Cadwallader et al., U.S. Ser. No. 616,870, filed Feb. 17, 1967. In the specification of that application, which is incorporated herein by reference, the advantages of self-locking fasteners having thermoplastic material bonded to the internal threads were disclosed together with a general method of applying the patches of thermoplastic material. The present invention provides an apparatus for producing such self-locking threaded fasteners rapidly in volume quantities for production line operations.

It is, therefore, one of the objects of this invention to provide an apparatus to produce, in a rapid automated operation, self-locking female threaded fastener elements which have a patch of thermoplastic material bonded to the internal threads. It is also an object of the present invention to provide such an apparatus which is simple and economical in construction and fool-proof in operation. It is a further object of the present invention to provide an apparatus to feed threaded fastener elements automatically to a continuously moving support which in turn passes the fastener elements through a heating zone, a patch insert and bonding station, and an ejection station in a smooth, rapid, continuous, automatic operation.

In the drawings:

FIG. 1 is a perspective view, with certain parts omitted for clarity, showing the apparatus of the present invention;

FIG. 2 is a sectional elevational view taken on line 2—2 of FIG. 1, showing the rotary drive mechanism;

FIG. 3 is a horizontal plan view taken on line 3—3 of FIG. 2, showing details of the drive transfer mechanism;

FIG. 4 is a vertical sectional view taken on line 4—4 of FIG. 2, showing a detail of the threaded fastener feed mechanism;

FIG. 6 is a view, partly in section, taken on line 6—6 of FIG. 1, showing the lower portion of the patch feed and insertion mechanism in extended position;

FIG. 7 is a view similar to FIG. 6 taken on line 7—7 of FIG. 1, showing the patch feed and insertion mechanism in retracted position;

FIG. 8 is a vertical sectional view taken on line 8—8 of FIG. 7;

FIG. 9 is a vertical sectional view taken along line 9—9 of FIG. 8, showing the insertion mechanism within a threaded fastener element; and FIG. 10 is a vertical sectional view taken on line 10—10 of FIG. 9.

Figure 5:
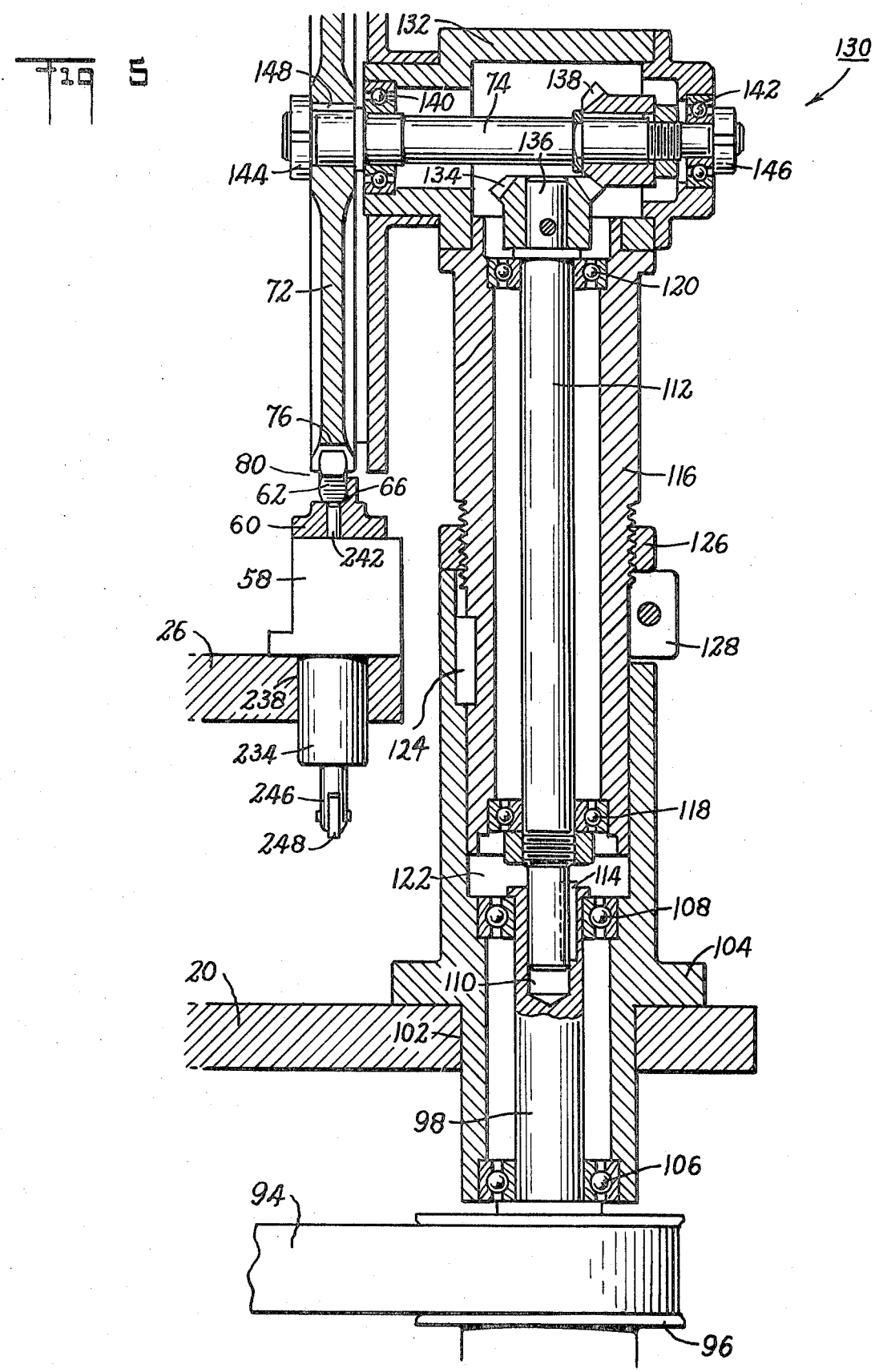
FIG. 5 is a vertical sectional view taken on line 5—5 of FIG. 4, showing the drive for the threaded fastener feed mechanism.

Referring now to the drawings, particularly FIGS. 1 and 2, the nut machine 12 includes a base support housing 14 having a top 16 which supports a rotary table assembly 18. The rotary assembly 18 includes a stationary circular base plate member 20 supported above the top of the housing 18 by a generally cylindrical support housing 22. A shaft 24 passing centrally through the support housing 22 is fixed to the top 16 of base housing 14 and provides central support for a rotating platform 26 of rotary table assembly 18. Platform 26 of rotary table assembly 18. Platform 26 is mounted for rotation about the central shaft 24 and is secured to a radially projecting flange 28 of a bushing 30, for example by bolts 32. Bushing 30 has an inner diameter which is larger than the diameter of shaft 24 so that the bushing and platform are free to rotate about shaft 24. Bushing 30 and platform 26 are rotatably mounted in support housing 22 by thrust bearings 34 and 36 which are positioned in respective bearing seats 38 and 40 formed in the support housing 22.

The main power source to rotate platform 26 is provided by a motor (not shown), mounted within base housing 14, having an output shaft 42 and a drive pulley 44. A drive belt 46 transfers the rotational output from pulley 44 to a pulley 48 fixed to a shaft 50 which is journaled in a housing 52 formed integrally with the housing 22. Mounted on shaft 50 is a worm gear 54 which meshes with a beveled ring gear 56 extending around the circumference of and affixed to bushing 30 so that the rotational movement is transferred from pulley 44 to pulley 48 and thence through gear 54 and gear 56 to bushing 30.

Arranged around the periphery of platform 26 (see also FIGS. 4 and 5) is a support ring 58 upon which is located a nut retaining tray 60 to receive and retain female threaded fastener elements, such as nuts 62, from the nut feed assembly 64. Nut retaining tray 60 is constructed from a heat resistant material and includes spaced troughs 66 which are contoured to conform to the shape of the nuts 62 for example, having the shape of a half hexagon, so that hex-shaped nuts may be retained snugly in proper alignment within tray 60.

The nuts 62 are continuously fed to the rotating retaining tray 60 by means of a nut feed assembly 64. The nuts are stored (see FIG. 1) in a vibratory hopper feed unit 68 and are fed through a chute 70 to a point 78 (FIG. 4) above the horizontal centerline of rotating nut feed wheel 72.

The nut feed wheel or starwheel 72 is fixed to a rotatably mounted shaft 74 and includes a plurality of troughs 76 around its periphery which are spaced to register with the spaced troughs 66 in the nut retaining tray 60. The shape of troughs 76 are similarly contoured to conform to the shape of the nuts——for example, half-hex shaped to enable starwheel 72 to engage, pickup and transfer nuts 62 as the wheel 72 rotates. The nuts are picked up at 78, at the lower end of the stack in the delivery chute 70, and are carried around the retaining tray 60 where they are deposited, as at 80, into a corresponding trough 66 in tray 60. An arcuate guard segment 82 retains the nuts in the starwheel as they are transferred from pickup point 78 to delivery point 80.

The rotary drive for the nut feed assembly 64 is obtained from the main drive in housing 14 (see FIGS. 2, 3 and 5) through a series of belt drive transfers. The belt drive transfers include a pulley 84, keyed to the lower end of rotating bushing 30, which drives a belt 86 and through belt 86 drives a pulley 88 keyed to shaft 90 which is rotatably mounted on the underside of stationary platform 20. A pulley 92 having a larger diameter than pulley 90, to effectuate a proportionate speed increase, is keyed to rotate with shaft 90 and drives a belt 94 to rotate pulley 96 on the main drive shaft 98 of the nut feed assembly 64.

The nut feed assembly 64 is supported by a cylindrical housing 100 extending through stationary plate member 20, as at 102, and is supported on stationary plate 20 by flanged extension 104. Shaft 98 is supported within housing 100 by bearing members 106 and 108, so as to be freely rotatable therein, and includes an axial bore 110 in its upper end to receive the lower end of secondary drive shaft 112. Shaft 112 is fixed by a key 114 to shaft 98 so that it rotates with shaft 98 and is rotatably supported within a housing 116 by bearings 118 and 120. Housing 116 is dimensioned to fit within an annular space 122 between housing 100 and shaft 98 and is fixed by a key 124 to housing 100 to preclude relative rotation between the housings. The vertical position of housing 116 and shaft 112, relative to housing 100 and shaft 98, is adjustable by means of a geared adjustment means 126 and position lock 128. This feature of adjustability allows the nut feed assembly 64 to be vertically adjusted to accommodate nuts of different sizes without necessitating major structural changes to the basic drive mechanisms and supports.

At the top of housing 116 is a drive transfer assembly 130 mounted in a housing 132. The drive transfer assembly 130 includes a helical gear 134, mounted on a shoulder extension 136 of shaft 112, which meshes with a helical gear 138 mounted on the starwheel drive shaft 74. Shaft 74 is supported within housing 132 by bearings 140 and 142 and is secured against axial displacement by end stop nuts 144 and 146. The starwheel 72 is fixed to driving shaft 74 by a key 148 and thus is rotated when shaft 74 is rotated through the drive transfer assembly 130 as a result of the rotation imparted through belt 94 and pulley 96.

As viewed in FIG. 1, the rotation of platform 26 is counterclockwise and, after the nuts 62 are deposited in the nut retaining trays 60, this rotation carries the nuts in the tray through an induction heater element 150. The heater element 150 is supported on stationary platform 20 by support members 152 and 154 and includes a pair of heater coil elements which are concentrically arranged in a circular arc segment at an elevation above the rotating platform 26 so that the nuts 62, as they rotate with the platform 26, pass between the heater coil elements. The heater element 150 raises the temperature of the nuts to 250° to 700° F. After the temperature of the nuts has been raised to the desired value, a patch of thermoplastic material is inserted into the body of the nut and is fused to the threads of the nut, as will be explained more fully below.

On the upper side of platform 26, positioned radially inward from peripheral ring 58, are a plurality of circumferentially spaced sliding block assembles 156 which are positioned for limited radial movement from a first extended position, shown in FIG. 6, to a second retracted position, shown in FIG. 7. Each sliding block assembly includes a base 158 having opposed parallel side surfaces which fit snugly but slidably within machined guide rods 160 on each side of block assembly 156. Each sliding block assembly 156 includes a bore 162 in the rear of base portion 158 to receive a locating rod 164 which is mounted in a block support 166 positioned centrally of the guide rods 160. A compression spring 168 mounted on block 166 and encircling rod 166 abuts against the rear portion of the base member 158 to urge the sliding block assembly 176 radially outward away from the block 166. An end block 170 having a threaded adjustment screw 172 limits the outward movement of the block assembly 156.

As shown in FIG. 1 retraction of the sliding block assembly 156 is initiated by a cam guide slot 174 which is positioned above the rotary platform 26 and is fixed, through radial arms 176, to a stationary collar 178. The guide slot 174 extends for approximately a 270° segment of the full circle of revolution and includes a lead-in segment 180 and lead-out segment 182.

The cam guide slot 174 cooperates with a roller member 184 rotatably mounted on the rear portion of base member 158 of the sliding block assembly 156. As the platform 26 rotates, the roller member 184 engages the lead-in slot 180 and the block 156 is gradually retracted compressing spring 168 until, as shown in FIG. 7, the roller 184 and block 156 have been completely retracted. Since the roller member 184 is rotatably mounted on block 156, it rolls along the inner side of extending lip 186 of the guide slot 174 as the block 156 rotates with platform 26. After the platform 26 has rotated 270° the block extends again, urged outward by the spring 168, after the roller 184 has passed through the lead-out segment 182. Thus, for approximately 90° of the platform's rotation the sliding block assembly is fully extended.

The insertion of the patch of thermoplastic material into the nuts 62 is accomplished during the first part of the 90° portion of rotation in which the block assembly 156 is extended. Each block assembly 156 includes an elevated portion 186 with a pair of parallel bores 188 extending therethrough. A guide rod 190 is positioned in each of the bores 188 and each rod 190 includes an end portion 192 adapted to fit concentrically within the body of the nuts 62 when block 156 is extended. As shown in FIG. 10, the diameter of rod 190 is less than the internal diameter of the nut so that when the end 192 is within the nut body there is an annular clearance 193. As shown in FIGS. 8 and 9, a collar 194 is mounted over the end of bore 188 with guide rod 190 passing therethrough. The collar 194 has a feed slot 196 which communicates with a semicircular channel portion 198 defined by the lower circumference of guide rod 190 and the lower portion of a larger bore 200 in the collar 194. The strip of thermoplastic material 202 from a continuous supply, such as a tape reel, is incrementally fed through feed slot 196 until the tape strip curls around guide rod 190 in the channel portion 198. Each collar 194 is provided with a slot 204 which intersects the tape feed slot 196 to slidably support a tape cutter blade 206. The blade 206 is actuated in any convenient manner, i.e., by pneumatic or cam initiated action, to move inwardly in the slot 204 and cut the tape 202 after it has been fed into the collar so that its leading edge 208 has advanced around guide rod 190 approximately 100°. The cutting action thus results in a patch of tape 210 which is curled into an arc of approximately 100°.

The patch of thermoplastic material 210 is then inserted into the nut by means of a pusher assembly 212 comprising a cylindrical sleeve 214 (FIG. 9) which surrounds guide rod 190 and has a lower projecting arcuate portion or finger 216 at one end. The other end of sleeve 214 extends out bore 188 and has a collar 218 (FIG. 6) which forms an abutting shoulder for one end of a compression spring 220. The other end of spring 220 abuts against a seating collar 222 around bore 188. Spring 220 thus urges the cylindrical sleeve member 214 rearward so that the projecting arcuate finger 216, in its at rest position, is completely within bore 188. Sleeve 214 terminates in a bifurcated portion 223 and a roller element 224 is rotatably mounted on a shaft 226 therein.

After the block 156 has passed lead-out slot 182, the roller element 224 engages a cam guide 230 which, as roller 224 maintains rolling contact with the guide, compresses spring 220 so that sleeve 214 is urged into block 156. The extending finger 216 is urged out of bore 188 to contact the patch 210 and pushes it along the channel portion 198 between collar 194 and guide rod 190 into the nut. Cam guide 230 is a short segment, hence, as soon as the patch of thermoplastic material has been inserted in the nut, the sleeve 214 retracts within block 156 under the urging of spring 220. The patch 210 is inserted into the nut during that portion of the cycle of rotation where the block assembly 156 is extended so that the guide rod 190 is in extended position with end portion 192 concentrically disposed within the internal bore of the nut 62.

Immediately after the patch has been deposited within the nut 62, pressure between the patch and the nut is applied in order to obtain a complete and uniform bond. To apply this pressure, each station 66 at which nuts are retained in tray 60 is provided with a cam actuated vertically movable plunger assembly 232 (FIGS. 6 and 7). Each plunger assembly 232 includes a barrel support 234, having a flange 236 to support the barrel within a bore 238 in the rotary platform 26, with the upper end of the barrel support 234 being housed within a bore 240 in ring 58. A plunger rod 242 is mounted for reciprocating movement within the barrel 234 and is positioned so as to be in alignment with a bore 244, communicating with the nut holding trough 66, in the nut receiving tray 60. Rod 242 is spring biased (not shown) so that its normal at rest position is one where the upper end of rod 242 is below the bottom of the nut receiving trough 66. The lower end of rod 242 is provided with a bifurcated portion 246 to hold a rotatably mounted roller element 248.

The plunger mechanism is actuated three times during a cycle of rotation of platform 26, the first time immediately after the patch 210 of thermoplastic material has been inserted in the nut, the second time to eject the nut from the tray before the completed nut reaches nut feed point 80, and the third time just before a nut is transferred to the retaining tray 60.

The rod 242 is actuated when roller 248 contacts a cam guide section 250 (see FIG. 1), which has an inclined lead-in portion 252 and an inclined lead-out portion 254, so that the roller element 248, as platform 26 rotates, engages the inclined lead-in portion 252 and rides up the incline and rides along cam guide 250. This causes the plunger rod 242 to compress the spring biasing within the tube 234 so that the rod rises up and engages the bottom surface of the nut 62. Since the guide rod 190 is positioned within the nut, the plunger rod 242, when raised, engages the bottom of the nut. The nut is raised slightly in its holding trough 66 causing the lower portion of the inner circumference of the nut to press against the guide rod 190. Hence, the patch 210 of thermoplastic material is subjected to the pressure created by the plunger rod pushing the nut against the guide rod 190. After the plunger rod retracts, i.e., after roller elements 248 have rolled down inclined portion 254, the roller element 184 on block 156 engages the lead-in portion 180 of cam guide 174 and the block assembly 156 is retracted from its engagement with the nut.

As the platform continues to rotate, the nuts are free in troughs 66, and, when the platform rotates to the point 256 just before the nut feed point 80, the roller 248 contacts a contoured cam guide 258 so that plunger rod 242 again extends to lift the nuts slightly above the holding tray 60. A nut takeoff slide 260 catches the raised nuts and scoops the completed nut assembles into a chute 262 which directs the nuts to a suitable storage receptacle.

The plunger rod 242 is also elevated during the nut feed operation by a cam guide section 264 (see FIG. 2) which is similar to the cam guide section 250. The cam guide section 264 is positioned relative to nut feed assembly 64 so that rod 242 is partially elevated within a trough 66. When that trough, during rotation of platform 26, approaches the nut transfer point 80 (see FIG. 4) so that, as a nut 62 is brought into register with that trough 66, the rod 242 holds the nut within a trough 76 on wheel 72 until the nut is directly over the transfer point 80. This prevents the nut from tumbling which could result in nut misalignment during the transfer of the nut into trough 66. Cam guide 264 is a relatively short section and has a lead-out portion (not shown) which allows plunger 242 to retract just before transfer point 80 is reached.

It is thus seen that the apparatus of the present invention provides an apparatus for manufacturing self-locking threaded fastener elements, such as nuts, which have a segment or patch of thermoplastic material bonded to a portion of the internal threads. The operation is continuous in that the rotating platform 26 is designed to rotate at a constant speed and, since the nut feeding assembly 64 is geared to the main drive, the nut feed operation is also at a synchronous constant speed. Thus, the entire operation is accomplished in a smooth, continuous manner resulting in a uniform rate of production.

We claim:

1. An apparatus to produce self-locking threaded fasteners which have a patch of thermoplastic material bonded to the threads of the fastener comprising:
   a movable support platform adapted to receive threaded fasteners from a continuous-feed supply;
   said support platform including means to impart continuous movement thereto;
   heating means adjacent said support platform to heat said threaded fasteners; and and
   reciprocating insert means to insert a patch of thermoplastic material within said threaded fasteners while said fasteners are on said support platform and while said support platform is moving.

2. The apparatus as defined in claim 1 wherein said support platform includes a table member supported for rotational movement on a fixed base support member, a ring support member near the periphery of said table member having circumferentially spaced threaded fastener retaining stations to receive said threaded fasteners from said continuous feed supply and position them to receive a patch of thermoplastic material from said insert means.

3. The apparatus as defined in claim 2 wherein said continuous-feed supply for said threaded fasteners includes a rotary delivery member adapted to pick up and retain threaded fasteners from a first station and deliver said fasteners serially to the circumferentially spaced retaining stations on said table member.

4. The apparatus as defined in claim 2 wherein said rotating table member includes a plurality of circumferentially spaced sliding block assembles to selectively extend and retract radially thereby to engage said threaded fasteners during a portion of the cycle of rotation of said table member, said insert means being supported in said sliding block assembles.

5. The apparatus as defined in claim 4 wherein said rotary table member includes spaced radially extending guide rails positioned radially inwardly from said fastener retaining stations, said sliding block assembles adapted to slide within said guide rails from a first position in engagement with said fasteners to a second retracted position, each said block assembly including means to cut a patch of thermoplastic material from a continuous tape roll of thermoplastic material and to insert said patch into said threaded fastener whereby said patch of thermoplastic material is bonded, due to the elevated temperature of the fasteners, to the threads of said fasteners.

6. The apparatus as defined in claim 5 wherein said insert means remains in compressive engagement with said patch after insertion in said fastener thereby to insure a good bond between said patch and said fastener.

7. In an apparatus to produce self-locking female threaded fasteners having a patch of thermoplastic material bonded to the internal threads of the fastener:
   a circular support platform including means to rotate said platform;
   a ring member near the periphery of said platform;
   said ring member including threaded fastener holding stations at circumferentially spaced positions;
   means to deliver female threaded fastener elements to said fastener holding stations while said platform is rotating;
   means to heat said fastener elements in said holding stations; and
   reciprocating means mounted on said support platform to insert a patch of thermoplastic material into each said heated fasteners thereby to bond said patch to the internal threads of said fasteners.

8. The apparatus as defined in claim 7 wherein said means to deliver threaded fasteners to said support platform includes a rotatably mounted transfer plate having spaced fastener receiving stations around its periphery, the spacing of said stations corresponding to the spacing of the holding stations on said support platform, said transfer plate being mounted substantially perpendicular to said platform and positioned such that during rotation of said platform and said transfer plate said fasteners are deposited in the holding stations in said ring member.

9. The apparatus as defined in claim 7 wherein said means to insert a patch of thermoplastic material into each said fasteners includes a support block, said block adapted to extend and retract from a first position radially inward from said fasteners in said receiving stations to a second position adjacent said fasteners, said block including at least one guide rod being disposed within the bore of said fastener, when said block is in said second position, a collar member surrounding said guide rod and fixed to said support block, said collar including means to position and align a patch of thermoplastic material and a spring biased plunger assembly in said block adapted to engage said patch and push it within said collar and into a fastener in said receiving station thereby to position said patch on the internal threads of said fasteners.

10. The apparatus as defined in claim 9 wherein each said receiving station includes means to selectively elevate a fastener member therein, said means being actuable after said patch has been inserted whereby said fastener element in said station is elevated thereby compressing said patch against said end of said guide rod to firmly bond said patch to said fastener.

11. The apparatus as defined in claim 9 wherein said thermoplastic material is supplied from a tape roll to said collar, each said collar including means selectively operable to cut a portion of thermoplastic material from said tape supply thereby to form said patch.

UNITED STATES PATENT OFFICE
CERTIFICATE OF CORRECTION

Patent No. 3,571,833                 Dated March 23, 1971

Inventor(s)      James W. Cadwallader et al.

It is certified that error appears in the above-identified patent and that said Letters Patent are hereby corrected as shown below:

On the cover sheet insert [73] assignee Standard Pressed Steel Co., Jenkintown, Pa., a corporation of Pennsylvania --.

Signed and sealed this 20th day of July 1971.

(SEAL)
Attest:

EDWARD M. FLETCHER, JR.          WILLIAM E. SCHUYLER, JR.
Attesting Officer                 Commissioner of Patents